March 22, 1960     J. A. MILLER     2,929,271
SIX SPEED PLANETARY TRANSMISSION

Filed May 23, 1957     2 Sheets-Sheet 1

INVENTOR
JAMES A. MILLER
BY
Kenneth C. Witt
ATTORNEY

March 22, 1960 J. A. MILLER 2,929,271
SIX SPEED PLANETARY TRANSMISSION
Filed May 23, 1957 2 Sheets-Sheet 2

INVENTOR
JAMES A. MILLER
BY Kenneth C. Witt
ATTORNEY

United States Patent Office 2,929,271
Patented Mar. 22, 1960

2,929,271

SIX SPEED PLANETARY TRANSMISSION

James A. Miller, Battle Creek, Mich., assignor to Clark Equipment Company, a corporation of Michigan Application May 23, 1957, Serial No. 661,249

15 Claims. (Cl. 74—759)

This invention relates generally to multispeed transmissions and, more particularly, to a six speed planetary transmission of the type especially well suited for use in trucks and other similar heavy duty vehicles.

The invention has for its principal object the provision of an improved transmission characterized by simple, compact, construction with the attendant advantages relative to economy of construction and simplicity of installation and maintenance. An important feature of the present invention resides in the novel arrangement of component parts through which a reduction of several inches in the overall length of the transmission has been achieved.

It is also an object of this invention to provide an improved transmission which, in one form, furnishes six forward speed drive ratios and three reverse speeds with all ratios being effected by the engagement of controllable friction devices and with each ratio being produced by simultaneous actuation of two of said controllable devices.

It is a further object of the present invention to provide an improved transmission employing four multiple-disk friction devices and two band-type friction devices which are arranged to be actuated in different pairs in order to complete the aforementioned six forward speed ratios and the three reverse drives.

In another form of the invention six forward speed ratios and a single reverse ratio can be achieved by application of different pairs of the controllable friction devices.

Another and more specific object of the present invention is to provide a multispeed transmission of the character indicated above employing a pair of simple planetary gear input sets and a compound, double pinion type planetary gear output set together with the aforementioned four multiple disk and two band-type friction devices all of which are assembled in a compact arrangement in order to minimize the length of the transmission.

The invention, both as to its organization and manner of operation, together with further objects and advantages thereof, will best be understood by reference to the specification taken in conjunction with the accompanying drawings wherein.

In accordance with the present invention, the foregoing and other objects are realized by providing a transmission including a pair of simple single pinion type planetary gear sets having an input element driven from the engine shaft of the vehicle through a torque converter or the like and having common output elements connected to drive an intermediate shaft. The latter shaft in turn drives an output planetary gear set of the compound double pinion type. A pair of band brakes associated with the output gear set may be selectively applied in order respectively to establish major and minor reductions in the output set while a multiple disk friction clutch may be selectively actuated to interconnect two of the elements of the output gear set to provide a direct drive therethrough. Similarly, a pair of fluid operated multiple disk friction brakes may be selectively actuated to hold two elements of the input gear sets stationary. Means comprising one or more additional friction clutches may be provided to provide a direct drive to the output gear set. As previously indicated, the described multiple-disk friction clutches and brakes and the two band brakes may be selectively actuated in different pairs in order to provide six forward speed ratios and three reverse drives through the transmission.

Figure 1:
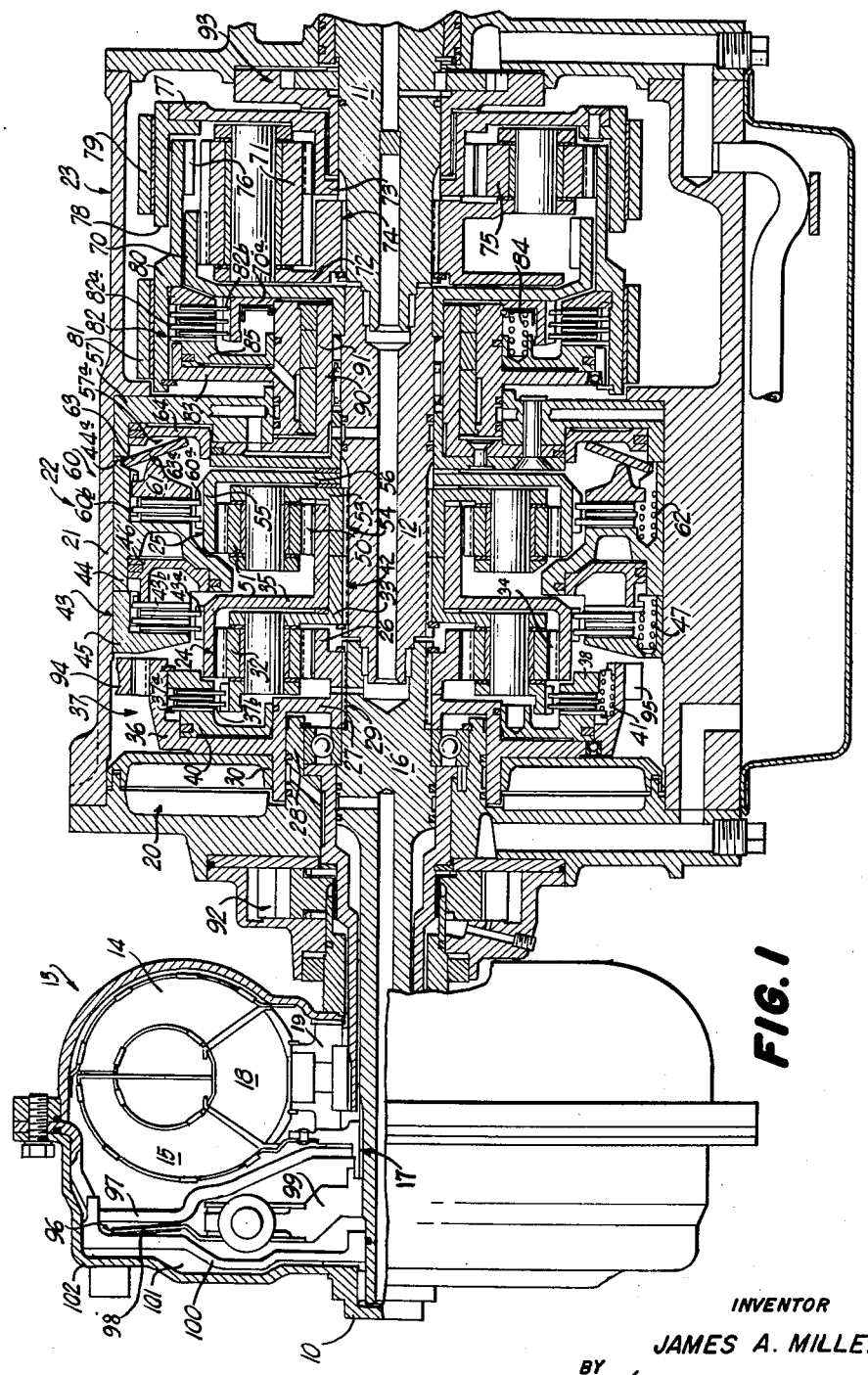
Fig. 1 is a fragmentary longitudinal view principally in section and partly broken away, illustrating a transmission characterized by the features of the present invention.

Referring now to the drawings, and more particularly to Fig. 1 thereof, there is disclosed a mechanism for transferring drive from a drive or engine shaft 10 to a driven or output shaft 11 by way of an intermediate shaft 12 axially aligned with and disposed between the drive and driven shafts. As is illustrated in Fig. 1, the shaft 10 may be connected to drive the impeller 14 of a torque converter 13. The output shaft 11 is, of course, adapted to be connected through conventional differential gearing and other suitable connecting means to the wheels of the vehicle.

The torque converter 13 also includes a turbine member 15 connected as indicated at 17 to drive an input shaft 16 and further includes reaction blades 18 connected through a one-way brake 19 of conventional construction to the fixed structure of a transmission casing 21. The latter casing houses a fluid retarder or fluid brake 20 which brake forms no part of the present invention but is described more fully hereinafter.

As is also shown in Fig. 1, the shafts 11, 12 and 16 have mutually telescoping end portions and are journaled within the transmission casing 21. This casing also encloses a pair of gear groups 22 and 23 connected in tandem between the input and output shafts, the input gear group 22 consisting of a pair of simple, single pinion type planetary gear sets respectively indicated by numerals 24 and 25 and the output gear group 23 consisting of a compound, double pinion type planetary gear set.

The planetary gear set 24 has an input sun gear 26 which includes an integral sleeve portion 27 supported for rotation about an inwardly extending boss 28 formed on the casing 21 and connected to one element or blade member 30 of the fluid brake 20. In order to transfer the drive from the input shaft 16 to the sun gear 26, the sleeve portion 27 is splined to the input shaft, as is indicated at 29. The gear set 24, in addition to the sun gear 26, comprises a plurality of planet pinions 32 spaced equal distances apart and rotatably mounted upon a planet carrier 33, with three such pinions preferably being provided. The pinions 32, of course, mesh with the sun gear 26 and with a ring gear 34 formed on a member 35 disposed between the gear sets 24 and 25. The sleeve portion 27 is provided with an integral extension 36 forming a clutch housing for a multiple-disk friction clutch 37.

The clutch 37 is of conventional construction and has a plurality of interleaved clutch plates 37a and 37b respectively carried by the housing 36 and by the planet carrier 33. The plates of the clutch 37 are disposed between an annular backing plate 38 splined to the clutch housing 36 and an annular piston 40 longitudinally movable within the housing. Suitable biasing springs 41 acting against the piston 40 normally maintain the clutch plates in disengaged position. Application of fluid pressure to the space between the housing 36 and the face of the piston 40 moves the clutch plates 37a and 37b into frictional engagement whereupon the sun gear 26 and the planet carrier 33 of the gear set 24 are interconnected and a direct drive is provided from the input shaft 16 to the intermediate shaft 12 in view of the fact that the planet carrier 33 is splined to the latter shaft as indicated at 42.

A multiple-disk friction brake 43 similar to the clutch 37 just described may be employed to hold the ring gear 34 stationary in order to provide a speed reduction through the input gear sets 24 and 25. More particularly, the brake 43 includes a plurality of interleaved plates 43a and 43b respectively secured to the ring gear 34 and to a clutch housing 44 affixed to the casing 21. The plates 43a and 43b are disposed between an annular packing plate 45 secured to the housing 44 and an annular piston 46 movable within the clutch housing. Biasing springs 47 normally urge the piston 46 towards the right as viewed in Fig. 1 to maintain the plates 43a and 43b disengaged. When fluid is admitted to the face of the piston 46, the plates are moved into frictional engagement to connect the ring gear 34 to the casing 21, thereby holding the ring gear stationary.

The gear set 25 includes a sun gear 50 formed on the member 35 and a plurality of equidistantly spaced planet pinions 51, preferably three in number, rotatably supported upon a planet carrier 53. The planet carrier 53, like the carrier 33 previously described, is splined to the intermediate shaft 12 as indicated at 54 and, hence, these carriers are effectively joined together and may be referred to as an output element of the input gearing 22. The planet pinions 51 mesh with the sun gear 50 and with a ring gear 55 formed upon an annular drum 56 disposed between the gear set 25 and a web 57 of the casing 21. In view of the foregoing description, it will be observed that, when the brake 43 is rendered effective to hold the ring gear 34 stationary in the manner described above, the sun gear 50 is likewise held against rotation, thereby to provide a speed reduction in the input gearing 22.

A second multiple-disk, friction brake indicated generally as 60 is provided for the purpose of holding the ring gear 55 stationary in order to obtain reverse drive. This brake includes interleaved plates 60a and 60b respectively secured to the ring gear 55 and to the housing 44 which, as previously mentioned, is affixed to the transmission casing 21. The plates 60a and 60b are adapted to be moved into engagement by means of an annular piston 61 mounted for longitudinal movement within the housing 44. The piston 61 is normally urged towards the right as viewed in Fig. 1 by springs 62. To increase the force applied to the piston 61 for the purpose of firmly holding the plates 60a and 60b in engagement, an annular washer 63 is provided having its outer peripheral portion disposed within a suitable recess 44a formed between adjacent portions of the housing 44 and the web 57. The washer 63 has an intermediate portion 63a in engagement with a projection in the piston 61 and has its inner peripheral portion in engagement with a fluid operated piston 64, disposed for longitudinal movement within a clutch chamber 57a formed in the web 57. When fluid is admitted to the space between the face of the piston 64 and web 57, the piston 64 is, of course, moved to the left as viewed in Fig. 1 and the force of this movement is transmitted through the washer 63 to the piston 61 in order to move plates 60a and 60b into frictional engagement, thereby to connect the ring gear 55 to the casing 21 and hold the ring gear stationary. When the ring gear 55 is held stationary a speed reduction is produced by the input gearing 22 and the intermediate shaft 12 is rotated in a reverse direction as will be recognized by those skilled in this art. When fluid pressure is removed from the face of piston 64 the biasing springs 62, of course, act against the piston 61 to move both of the pistons 61 and 64 to the right and to pivot the washer 63 about the peripheral portion disposed within recess 44a, thereby releasing the clutch plates 60a and 60b and freeing the ring gear 55 for rotation.

The rear or output gearing 23, as indicated above, consists of a double pinion type, compound planetary gear set comprising an input ring gear 70 secured to the intermediate shaft 12, with the result that this ring gear is permanently connected to be driven by the planet carriers 33 and 53 of the gear sets 24 and 25, respectively, and hence may be considered to be an input element of the rear planetary gearing. The gear set 23 further comprises a plurality of equidistantly spaced elongated planet pinions 71 rotatably mounted upon a planet carrier 72 and meshing both with the ring gear 70 and with a sun gear 73. The planet carrier 72, as indicated at 74, is splined to the output shaft 11 and, hence, may be referred to as the output element of the gearing 23. The gear set 23 further includes a plurality of equidistantly spaced, relatively short pinions 75, preferably three in number, rotatably mounted upon the planet carrier 72 and meshing both with the planet pinions 71 and with a ring gear 76 formed upon an elongated brake drum 80 encircling the gear set 23. An integral extension 77 formed on the sun gear 73 terminates in a brake drum 78 which is adapted to be engaged and held by a band brake 79 in order to provide a minor reduction in the rear planetary gearing. In similar manner, the drum 80 is adapted to be engaged and held by a band brake 81 in order to hold the ring gear 76 and provide a major speed reduction through the gearing 23.

The brake drum 80 also carries a clutch housing 83 for a second multiple-disk friction type clutch 82 which is similar in construction to the multiple-disk clutches and brakes described above. The clutch 82 comprises interleaved plates 82a and 82b respectively carried by the drum 80 and by extension 70a formed on the ring gear 70. Clutch plates 82a and 82b are normally held in disengaged position by means of biasing springs 84 acting against a clutch piston 85. When the plates of the clutch 82 are engaged by application of fluid pressure to the face of the piston 85 in opposition to the biasing springs, the ring gear 76 is connected directly to the ring gear 70 and, accordingly, the gearing 23 is locked up to provide direct drive from the intermediate shaft 12 to the output shaft 11.

For the purpose of taking or assuming the torque reaction during the transition from one of the gear ratios to the next, specifically in the transition from third speed to fourth speed, in order to prevent interruption of torque from the engine shaft 10 to the output shaft 11, an overrunning or one way brake indicated at 90 may be provided. The latter brake is of conventional construction and is disposed between the clutch housing 83 and a sleeve 91 affixed to the web 57. The one way brake 90, when operated, functions to hold a ring gear 76 stationary by locking it to the casing 21 and thus permits a smooth transition from the third speed ratio to the fourth speed ratio by allowing the release of two of the friction elements while picking up only one. The one way brake 90 thus reduces the timing requirements in the gear sets which requirements would, in the absence of the clutch, be somewhat delicate. Thus, the one way brake 90 functions to hold the ring gear 76 stationary until the clutch 37 and the brake 81 are applied. It should be understood, however, that the one way brake 90 may be eliminated by designing the transmission control system so that the brake 81 and the clutch 37 are applied simultaneously with the release of clutch 82 and brake 43.

The transmission casing 21 also encloses front and rear pumps 92 and 93 of conventional construction which perform the functions of pressurizing and feeding oil to the torque converter 13, providing lubrication for the transmission gearing, for cooling the friction brakes and clutches, if necessary, and also for providing fluid pressure to engage the friction bakes and clutches.

To provide power take-off for driving auxiliary equipment on the vehicle, a reach-in type adapter unit (not shown) may be inserted through an opening provided in the casing 21 until its driven gear 94 engages an externally toothed portion 95 of the clutch housing 36 which is fixed to the input shaft 16. The provision of power take-off directly from the input shaft insures that the auxiliary equipment will not be affected by the speed reductions provided by the transmission and the use of the externally toothed portion 95 facilitates the assembly since it provides the power take-off at a point that is readily accessible to the adapter unit.

In order to bypass the torque converter 13 at high speed ratios, thereby avoiding torque converter losses resulting from movement of the fluid therein, there is provided a lock-up clutch indicated generally as 96. This clutch includes a plate or disk 97 connected to the impeller 14 of the torque converter and, hence, driven directly from the engine shaft 10. A clutch plate 98 carried upon suitable structure 99 splined to the input shaft 16 is adapted to be moved into engagement with the plate 97 in order to connect shaft 10 directly to the input shaft 16, thereby bypassing the torque converter 13. The described movement of the clutch plate is effected by a fluid operated piston 100 mounted for sliding longitudinal movement upon the shaft 16. Thus, when fluid is introduced to the space 101 between the piston 100 and the torque converter housing 102, the piston 100 is moved to the right to bring plates 97 and 98 into engagement. In the absence of fluid pressure within chamber 101, the resilience of plate 98 is sufficient to release the clutch 96 and permit rotation of shaft 16 from the turbine 15 of the torque converter. The fluid pressure for operating clutch 96 may be introduced simultaneously with the pressure for operating the clutch 37 described above, or alternatively, these clutches may be operated separately and independently. The clutch 96, when energized, bypasses the torque converter 13 by connecting the drive shaft 10 directly to the input shaft 16. It is generally desirable to provide such a bypass at the higher forward speed ratios in order to avoid torque converter losses and, hence, to improve the efficiency of the transmission. In one embodiment of the present invention fluid pressure is supplied simultaneously to both of the clutches 96 and 37 in the three highest forward speed ratios to provide a direct drive between the engine shaft 10 and the intermediate shaft 12. As indicated above, however, the clutch 96 may be actuated independently of clutch 37, if desired, to effect torque converter bypass at any selected ratio or ratios.

As previously indicated, the transmission of the present invention is particularly well suited for use on trucks or heavy duty vehicles and, to this end, provides a neutral condition, together with six forward speed drive ratios and up to three reverse drive ratios. The transmission may be operated either automatically or manually by simultaneously applying different pairs of the clutches and brakes. For automatic operation the clutches 96—37 and 82 and the brakes 43, 60, 79 and 81 may be operated by the selective application of hydraulic pressure from any suitable control mechanism, as will be readily understood by those skilled in this art. This fluid is supplied by pumps 92 and 93 through suitable axially extending passages in the shafts 11, 12 and 16 and though appropriate openings in the various components as illustrated in Fig. 1.

In neutral condition all of the clutches and brakes are disengaged, whereupon torque will be transmitted from the vehicle engine through the torque converter 13 to the input shaft 16, thereby to effect rotation of the sun gear 26 for the input gear set 24 and also to drive the power take-off gear 95. No torque is transmitted to the driven shaft 11 in view of the absence of reaction elements in both of the gearings 22 and 23.

Figures 2, 3:
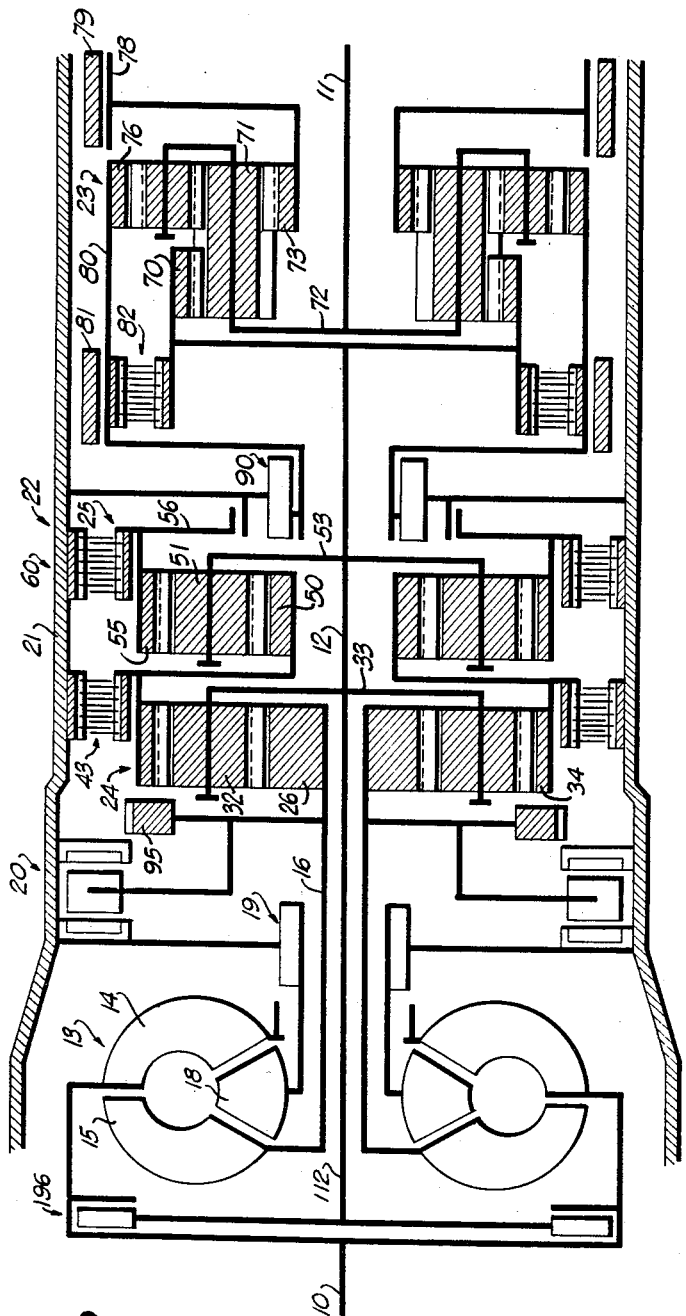
Fig. 2 is a schematic diagram of an alternative arrangement of the transmission shown in Fig. 1.
Fig. 3 is a table showing the various pairs of controllable friction devices which are engaged to complete the different drive ratios through the transmision illustrated in Fig. 1.

As will be apparent from a study of the table shown in Fig. 3, the first forward speed ratio is established by simultaneously applying the brake 43 and the brake 81, thereby effecting major speed reductions in both the input and output gear groups. It will be understood that, at this time, the brakes 60 and 79 and the clutches 37—96 and 82 are not engaged. Rotation of the drive shaft 10 and the sun gear 26 then causes the drive to pass through the planet pinions 32 and the planet carrier 33 and through the intermediate shaft 12 to the ring gear 70 of the output planetary gearing 23. Power then flows from the ring gear 70 to the planet pinions 71 and then to the planet carrier 72 which is attached to the driven shaft 11.

The second forward speed ratio is obtained by releasing the band brake 81 and applying the band brake 79 while holding the brake 43 applied. Application of the brake 79 places the output gear group 23 in minor speed reduction while the input gear group 22 remains in reduction.

The third forward speed ratio is obtained by releasing the brake 79 and actuating the clutch 82, while at the same time holding the brake 43 applied. With the clutch 82 applied, the output gear group 23 is locked up for direct drive while the input gear group 22 obviously remains in reduction.

To provide the fourth forward speed ratio the brake 43 and clutch 82 are both released and the brake 81 and clutch 37 are applied. When devices 43 and 82 are released the torque path from the engine shaft 10 to the output shaft 11 is temporarily interrupted and the engine shaft tends to speed up. As soon as this speed-up reaches a predetermined point the overrunning brake 90 becomes effective to lock the ring gear 76 to the transmission casing thereby assuming the torque reaction until the brake 81 and clutches 37—96 come into play. When brake 81 is applied, it of course, takes over the function of the overrunning brake 90 and holds the ring gear 76 to provide major speed reduction in the gearing 23. Application of clutch 37, of course, locks the input shaft 16 to the intermediate shaft 12, thereby providing a direct drive through the input gear group. As indicated above, clutch 96 may at this time be actuated to bypass the torque converter 13 although this is not necessarily the case.

The fifth forward speed drive is established by releasing the brake 81 and applying the brake 79, while at the same time maintaining the clutch 37 applied. With the brake 79 applied, the output planetary gear group is placed in minor speed reduction while the input gearing remains in direct drive. Again the torque converter bypass clutch 96 may be energized if desired.

The sixth forward speed drive is obtained by releasing the brake 79 and applying the clutch 82, while maintaining the clutch 37 in energized condition. With the clutch 82 applied, the ring gears 70 and 76 of the gear set 23 are directly connected together and the gearing 23 is locked for direct drive therethrough. Since the input gearing 22 is still locked up by the clutch 37, it will be understood that a direct drive is provided from the input shaft 16 to the output shaft 11. The torque converter bypass clutch 96 is preferably energized.

Reverse drive is effected by simultaneously applying the multiple-disk brake 60 and the band brake 81. As indicated above, major speed reduction is provided in the output gearing 23 with the brake 81 applied. With the brake 60 applied, the ring gear 55 of the gear set 25 is held stationary with the result that the intermediate shaft is driven in a reverse direction.

In the transmission illustrated in Fig. 1, only one reverse drive is available, because the overrunning brake 90 prevents use of a smaller reduction in reverse. In reverse, the drum 80 is held stationary by the brake 81 and takes all of the reaction of the rear gear set. The brake 90 permits rotation in the direction of the reaction required and, hence, takes none of the reaction of the rear set. Any attempt to release brake 81 and establish a smaller reduction in the rear set would cause the one way brake 90 to come into play to effect a complete lock-up of the rear set.

Since, as indicated above, use of the one way brake 90 is optional, it may be eliminated in which case a reverse drive may be established in the manner previously described by simultaneously applying band brake 81 and multiple-disc brake 60, thereby effecting reverse rotation of the intermediate shaft by the first gear set and at the same time producing a major speed reduction in the rear gear set. A second reverse drive may be obtained by simultaneously applying brake 60 and band brake 79. With brake 79 applied, the output gearing 23 is in minor speed reduction while the application of brake 60 again causes reverse rotation of shaft 12.

A third reverse drive may be provided by simultaneously applying brake 60 and clutch 82. Application of brake 60 causes the intermediate shaft 12 to rotate in the reverse direction while application of clutch 82 locks up the output gearing for direct drive therethrough.

A fluid brake like that indicated at 20 has been used heretofore on transmissions of the general type involved in the present invention. This brake is normally empty of fluid and is adapted to be filled by the selective operation of a manual control which may be actuated either by hand or foot. The device is used to provide a braking action as, for example, when the truck or vehicle is descending a relatively steep grade and it is effective to provide a load on the sun gear 26 in a manner which will be evident to those skilled in this art.

The transmission illustrated schematically in Fig. 2 is generally similar to that shown in Fig. 1 and described above but it employs a single fluid operated clutch indicated generally at 196 to perform the functions of the clutches 37 and 96 previously mentioned. Corresponding elements of the transmissions shown in Figs. 1 and 2 have been assigned the same reference numerals and, accordingly, it will be observed that the clutch 196 when energized, connects the drive shaft 10 directly to an elongated extension 112 of the intermediate shaft 12, thereby to bypass both the torque converter 13 and the input gear group 22.

The transmission shown in Fig. 2, like that previously described, is effective to provide six forward speed drive ratios and a single reverse drive since it is shown with the overrunning brake 90 used in the rear set. The reverse drive and the first three forward speed ratios are produced in exactly the same manner as the corresponding ratios in the transmission shown in Fig. 1. The fourth forward speed ratio is obtained by simultaneously applying clutch 196 and brake 81 to provide a direct drive from the engine shaft 10 to the intermediate shaft 12 and a major speed reduction in the output gearing 23. The torque converter and the input gearing art, therefore, bypassed. The fifth forward speed ratio is obtained by maintaining clutch 196 applied while releasing brake 81 and actuating brake 79. The latter brake is, of course, effective to provide minor speed reduction in the output gearing. The sixth forward speed ratio is obtained by maintaining clutch 196 applied, releasing brake 79 and energizing clutch 82, thereby to effect a direct drive from the engine shaft 10 to the output shaft 11.

Again the overrunning brake 90 may be eliminated from the arrangement shown in Fig. 2, in which case two additional reverse drives become available, one of which is established by application of brake 60 and brake 79 to provide minor reduction in the rear set and the other of which is established by application of brake 60 and clutch 82 to provide direct drive in the rear set.

Thus, it will be observed that the arrangement shown in Fig. 2, both with and without the overrunning brake, eliminates one of the friction devices employed in the transmission of Fig. 1. However, the latter transmission possesses the advantage that direct drive through the torque converter can be accomplished at any speed ratio, forward or reverse.

In view of the foregoing description it will be recognized that the transmission of the present invention provides six forward speed ratios and at least one reverse drive between the input shaft and the output shaft, with each of these drives being effected by the simultaneous application of a pair of controllable friction devices. The arrangement of component elements is such that the front end of the transmission is sufficiently clear to permit auxiliary power take-off while the remaining parts are compactly arranged to reduce apreciably the length of the transmission.

While particular embodiments of the invention have been shown and described it will be understood, of course, that the invention is not limited thereto, since many modifications may be made, and it is therefore contemplated by the appended claims to cover any such modifications as fall within the true spirit and scope of the invention.

What is claimed as new and desired to be secured by Letters Patent of the United States is:

1. A multiple speed transmission for heavy vehicles comprising an input shaft, an output shaft, an intermediate shaft disposed between the input and output shafts, first and second planetary gearings connected in tandem between said input and output shafts, the first planetary gearing including an input element driven from said input shaft, first and second reaction elements and an output element secured to said intermediate shaft, means including a first friction device to hold said first reaction element stationary to provide a speed reduction in the first gearing, means including a second friction device to hold the second reaction element stationary in order to drive said intermediate shaft in a reverse direction, means including a third friction device to provide a direct drive from said input shaft to said intermedate shaft, the second gearing having a plurality of gear elements including an input element secured to the intermediate shaft, first and second reaction elements and an output element secured to said output shaft, means including a fourth friction device to hold the first reaction element of the second gearing in order to provide a minor forward speed reduction in the second gearing, means including a fifth friction device for holding the second reaction element of the second gearing to provide a major forward speed reduction in the second gearing, means including a sixth friction device for interconnecting two of the gear elements of the second gearing to provide direct drive from the intermediate shaft to the output shaft, said six friction devices being engageable in different pairs to provide six forward speed ratios and a reverse drive between said input shaft and said output shaft.

2. A multiple speed transmission for heavy vehicles comprising an input shaft, an output shaft, an intermediate shaft disposed between the input and output shafts, first and second planetary gearings connected in tandem between said input and output shafts, said first gearing including an input element driven from said input shaft, first and second reaction elements and an output element secured to said intermediate shaft, means including a first friction device to hold said first reaction element stationary, means including a second friction device to hold the second reaction element stationary to effect reverse drive of said intermediate shaft, means including a third friction device to clutch the said input element to the said output element and provide a direct drive from said input shaft to said intermediate shaft, the second gearing having a plurality of gear elements including an input element secured to the intermediate shaft, first and second reaction elements and an output element secured to said output shaft, means including a fourth friction device to hold the first reaction element of the second gearing for providing forward drive therethrough with a major speed reduction, means including a fifth friction device for holding the second reaction element of the second gearing for providing forward drive therethrough with a minor speed reduction, means including a sixth friction device for clutching together two of the said elements of the said second gearing for locking up the second gearing to provide direct drive from the intermediate shaft to the output shaft, said six friction devices being engageable in different pairs to provide six forward speed ratios and a reverse drive between said engine shaft and said output shaft, the first forward speed ratio being provided by holding the first reaction elements of each of said first and second gearings to establish a speed reduction in the first gearing and a major speed reduction in the second gearing, the second forward speed ratio being provided by holding said first reaction element of said first gearing and by holding the said second reaction element of the second gearing thereby obtaining a speed reduction in said first gearing and a minor speed reduction in said second gearing, the third forward speed ratio being obtained by simultaneously holding the first reaction element of said first gearing and by locking up said second gearing to obtain speed reduction in said first gearing and a direct drive through said second gearing, the fourth forward speed ratio being obtained by simultaneously holding said first reaction element of said second gearing to effect major speed reduction thereby and by locking up said first gearing for direct drive, the fifth forward speed ratio being obtained by simultaneously locking up said first gearing and by holding the second reaction element of said second gearing to obtain minor speed reduction therein, and the sixth ratio being a direct drive from the input shaft to the output shaft provided by simultaneous engagement of said third and sixth friction devices to lock up both said first and second gearings.

3. The transmission defined by claim 2 wherein one way brake means are provided for accepting the torque reaction of one of the reaction elements of said second gearing during the transition from the third speed ratio to the fourth speed ratio.

4. The transmission defined by claim 2 wherein said first and second gearings are housed within a casing and a one way brake acting between the casing and the said first reaction element of the second gearing is provided for the purpose of accepting torque reaction during the transition from the third ratio to the fourth ratio.

5. The transmission defined by claim 2 wherein the reverse drive is obtained by simultaneously holding the second reaction element of said one gearing and by holding one of the reaction elements of said other gearing.

6. A multiple speed transmission for heavy vehicles comprising an input shaft, an output shaft, an intermediate shaft disposed between the input and output shafts, first and second planetary gearings connected in tandem between said input and output shafts, the first planetary gearing including an input element secured to said input shaft, first and second reaction elements and an output element secured to said intermediate shaft, means including a first friction device to hold said first reaction element stationary to provide a speed reduction in the first gearing, means including a second friction device to hold the second reaction element stationary, means including a third friction device for clutching the said input element to the said output element to provide a direct drive from said input shaft to said intermediate shaft, the second gearing having a plurality of gear elements including an input element secured to the intermediate shaft, first and second reaction elements and an output element secured to said output shaft, means including a fourth friction device to hold the first reaction element of the second gearing in order to provide a minor speed reduction in the second gearing, means including a fifth friction device for holding the second reaction element of the second gearing to provide a major speed reduction in the second gearing, means including a sixth friction device for clutching the said input element of the second gearing to the said second reaction element of the second gearing for locking up the second gearing to provide direct drive from the intermediate shaft to the output shaft, said six friction devices being engageable in different pairs to provide six forward speed ratios and at least one reverse drive ratio between said engine shaft and said output shaft, the first forward speed ratio being provided by simultaneous engagement of said first and fifth friction devices to effect a speed reduction in the first gearing and a major speed reduction in the second gearing, the second ratio being provided by simultaneous engagement of said first and fourth friction devices to effect a speed reduction in the first gearing and a minor speed reduction in the second gearing, the third ratio being provided by simultaneous engagement of said first and sixth friction devices to obtain speed reduction in the first gearing and a direct drive through the second gearing, the fourth ratio being obtained by simultaneous engagement of said third and fifth friction devices, the fifth ratio being obtained by simultaneous engagement of the third and fourth friction devices, the sixth ratio being a direct drive from the input shaft to the output shaft provided by simultaneous engagement of said third and sixth friction devices, and the reverse drive being obtained by simultaneous engagement of said second device and a selected one of the fourth, fifth and sixth friction devices.

7. A multiple speed transmission for heavy vehicles comprising an engine shaft; an output shaft; an intermediate shaft disposed between the engine and output shafts; a torque converter including an impeller driven from said engine shaft and a turbine connected to drive an input shaft; first and second planetary gearings connected in tandem between said input and output shafts; the first planetary gearing comprising first and second gear sets each having a sun gear, a ring gear and at least one planet pinion carried by a planet carrier and meshing with said sun and ring gears, the sun gear of the first set being secured to said input shaft, the planet carriers of the first and second sets being secured to said intermediate shaft; means connecting the ring gear of the first set to the sun gear of the second set; means including a first friction device to hold the ring gear of the first set and the sun gear of the second set to provide a speed reduction in the first gearing; means including a second friction device to hold the ring gear of the second set in order to drive said intermediate shaft in a reverse direction; the second gearing having a plurality of gear elements including an input element secured to the intermediate shaft, first and second reaction elements, and an output element secured to said output shaft; means including a third friction device to hold the first reaction element of the second gearing in order to provide a minor speed reduction in the second gearing, means including a fourth friction device for holding the second reaction element of the second gearing to provide a major speed reduction in the second gearing, means including a fifth friction device for locking up the second gearing to provide direct drive therethrough, and means including a sixth friction device for connecting the engine shaft directly to said intermediate shaft to bypass both the first gearing and the torque converter, said six friction devices being engageable in different pairs to provide six forward speed ratios and a reverse drive between said engine shaft and said output shaft.

8. A multiple speed transmission for heavy vehicles comprising an engine shaft; an output shaft; an intermediate shaft disposed between the engine and output shafts; a torque converter including an impeller driven from said engine shaft and a turbine connected to drive an input shaft; first and second planetary gearings connected in tandem between said input and output shafts; the first planetary gearing comprising first and second gear sets each having a sun gear, a ring gear and at least one planet pinion carried by a planet carrier and meshing with said sun and ring gears, the sun gear of the first set being secured to said input shaft, the planet carriers of the first and second sets being secured to said intermediate shaft; means connecting the ring gear of the first set to the sun gear of the second set; means including a first friction device to hold the ring gear of the first set and the sun gear of the second set to provide a speed reduction in the first gearing; means including a second friction device to hold the ring gear of the second set in order to drive said intermediate shaft in a reverse direction; the second gearing having a plurality of gear elements including an input element secured to the intermediate shaft, first and second reaction elements, and an output element secured to said output shaft; means including a third friction device to hold the first reaction element of the second gearing in order to provide a minor speed reduction in the second gearing; means including a fourth friction device for holding the second reaction element of the second gearing to provide a major speed reduction in the second gearing; means including a fifth friction device for interconnecting two of the elements of the second gearing in order to lock up the second gearing for direct drive therethrough; and means including a sixth friction device for connecting the engine shaft directly to said intermediate shaft to bypass both the first gearing and the torque converter, said six friction devices being engageable in different pairs to provide six forward speed ratios and a reverse drive between said engine shaft and said output shaft, the first forward speed ratio being provided by simultaneous engagement of said first and fourth friction devices to effect major speed reductions in both the first and second gearings, the second ratio being provided by simultaneous engagement of said first and third friction devices to provide major reduction in the first gearing and minor reduction in the second gearing, the third ratio being obtained by simultaneous engagement of said first and fifth friction devices to obtain a major reduction in the first gearing and a direct drive through the second gearing, the fourth ratio being obtained by simultaneous engagement of said fourth and sixth friction devices, the fifth ratio being obtained by simultaneous engagement of said third and sixth friction devices, the sixth ratio being a direct drive from the engine shaft to the output shaft provided by simultaneous engagement of said fifth and sixth friction devices, and the reverse drive being obtained by simultaneous engagement of said second and fourth friction devices.

9. The transmission defined by claim 8 wherein means are provided for accepting the torque reaction during the transition from the third speed ratio to the fourth speed ratio.

10. The transmission defined by claim 8 wherein said first and second gearings are housed within a casing and a one way brake acting between the casing and the second reaction element of the second gearing is provided for the purpose of accepting torque reaction during the transition from the third ratio to the fourth ratio.

11. A multiple speed transmission for heavy vehicles comprising an engine shaft; an output shaft; an intermediate shaft disposed between the engine and output shafts; a torque converter including an impeller driven from said engine shaft and a turbine connected to drive an input shaft; first and second planetary gearings connected in tandem between said input and output shafts; the first planetary gearing comprising first and second gear sets each having a sun gear, a ring gear and at least one planet pinion carried by a planet carrier and meshing with said sun and ring gears, the sun gear of the first set being secured to said input shaft, the planet carriers of the first and second sets being secured to said intermediate shaft; means connecting the ring gear of the first set to the sun gear of the second set; means including a first friction device to hold the ring gear of the first set and the sun gear of the second set to provide a speed reduction in the first gearing; means including a second friction device to hold the ring gear of the second set in order to drive said intermediate shaft in a reverse direction; the second gearing including a first ring gear secured to the intermediate shaft, a pair of planet pinions meshing with each other and carried upon a planet carrier secured to said output shaft; a first of said pinions meshing with said first ring gear and with a sun gear and the second pinion meshing with a second ring gear; means including a third friction device to hold the sun gear of the second gearing in order to provide a minor speed reduction in the second gearing; means including a fourth friction device for holding the second ring gear of the second gearing to provide a major speed reduction in the second gearing; means including a fifth friction device for locking up the second gearing in order to provide direct drive from the intermediate shaft to the output shaft, said means including a sixth friction device for connecting the engine shaft directly to said intermediate shaft to bypass both the first gearing and the torque converter, said six friction devices being engageable in different pairs to provide six forward speed ratios and a reverse drive between said engine shaft and said output shaft.

12. A multiple speed transmission for heavy vehicles comprising an engine shaft; an output shaft; an intermediate shaft disposed between the engine and output shafts; a torque converter including an impeller driven from said engine shaft and a turbine connected to drive an input shaft; first and second planetary gearings connected in tandem between said input and output shafts; the first planetary gearing comprising first and second gear sets each having a sun gear, a ring gear and at least one planet pinion carried by a planet carrier and meshing with said sun and ring gears, the sun gear of the first set being secured to said input shaft, the planet carriers of the first and second sets being secured to said intermediate shaft; means connecting the ring gear of the first set to the sun gear of the second set; means including a first friction device to hold the ring gear of the first set and the sun gear of the second set to provide a speed reduction in the first gearing, means including a second friction device to hold the ring gear of the second set in order to drive said intermediate shaft in a reverse direction; the second gearing including a first ring gear secured to the intermediate shaft, a pair of planet pinions meshing with each other and carried upon a planet carrier secured to said output shaft, a first of said pinions meshing with said first ring gear and with a sun gear and the second pinion meshing with a second ring gear; means including a third friction device to hold the sun gear of the second gearing in order to provide a minor speed reduction in the second gearing; means including a fourth friction device for holding the second ring gear of the second gearing to provide a major speed reduction in the second gearing, means including a fifth friction device for locking up the second gearing in order to provide direct drive from the intermediate shaft to the output shaft; and means including a sixth friction device for connecting the engine shaft directly to said intermediate shaft to bypass both the first gearing and the torque converter, said six friction devices being engageable in different pairs to provide six forward speed ratios and a reverse drive between said engine shaft and said output shaft, the first forward speed ratio being provided by simultaneous engagement of said first and fourth friction devices to effect a speed reduction in the first gearing and a major speed reduction in the second gearing, the second ratio being provided by simultaneous engagement of said first and third friction devices to provide a reduction in the first gearing and minor reduction in the second gearing, the third ratio being obtained by simultaneous engagement of said first and fifth friction devices to obtain a reduction in the first gearing and a direct drive through the second gearing, the fourth ratio being obtained by simultaneous engagement of said fourth and sixth friction devices, the fifth ratio being obtained by simultaneous engagement of said third and sixth friction devices, the sixth ratio being a direct drive from the engine shaft to the output shaft provided by simultaneous engagement of said fifth and sixth friction devices, and the reverse drive being obtained by simultaneous engagement of said second and fourth friction devices.

13. A multiple speed transmission for heavy vehicles comprising an engine shaft; an output shaft; an intermediate shaft disposed between the engine and output shafts; a torque converter including an impeller driven from said engine shaft and a turbine connected to drive an input shaft; first and second planetary gearings connected in tandem between said input and output shafts, the first planetary gearing comprising first and second gear sets each having a sun gear, a ring gear and at least one planet pinion carried by a planet carrier and meshing with said sun and ring gears, the sun gear of the first set being secured to said input shaft, the planet carriers of the first and second sets being secured to said intermediate shaft; means connecting the ring gear of the first set to the sun gear of the second set; means including a first friction device to hold the ring gear of the first set and the sun gear of the second set to provide a speed reduction in the first gearing; means including a second friction device to hold the ring gear of the second set in order to drive said intermediate shaft in a reverse direction, the second gearing including a first ring gear secured to the intermediate shaft, a pair of planet pinions meshing with each other and carried upon a planet carrier secured to said output shaft, a first of said pinions meshing with said first ring gear and with a sun gear and the second pinion meshing with a second ring gear; means including a third friction device to hold the sun gear of the second gearing in order to provide a minor speed reduction in the second gearing; means including a fourth friction device for holding the second ring gear of the second gearing to provide a major speed reduction in the second gearing; means including a fifth friction device for interconnecting the first and second ring gears of the second gearing in order to lock up the second gearing for direct drive therethrough; and means including a sixth friction device for connecting the engine shaft directly to said intermediate shaft to bypass both the first gearing and the torque converter, said six friction devices being engageable in different pairs to provide six forward speed ratios and a reverse drive between said engine shaft and said output shaft, the first forward speed ratio being provided by simultaneous engagement of said first and fourth friction devices to effect a speed reduction in the first gearing and a major speed reduction in the second gearing, the second ratio being provided by simultaneous engagement of said first and third friction devices to provide a reduction in the first gearing and minor reduction in the second gearing, the third ratio being obtained by simultaneous engagement of said first and fifth friction devices to obtain a reduction in the first gearing and a direct drive through the second gearing, the fourth ratio being obtained by simultaneous engagement of said fourth and sixth friction devices, the fifth ratio being obtained by simultaneous engagement of said third and sixth friction devices, the sixth ratio being a direct drive from the engine shaft to the output shaft provided by simultaneous engagement of said fifth and sixth friction devices, and the reverse drive being obtained by simultaneous engagement of said second and fourth friction devices.

14. The transmission defined by claim 13 wherein means are provided for accepting the torque reaction during the transition from the third ratio to the fourth ratio.

15. The transmission defined by claim 13 wherein said first and second gearings are housed within a casing and a one way brake acting between the second ring gear of the second gearing and the casing is provided for the purpose of accepting the torque reaction during the transition from the third ratio to the fourth ratio.

References Cited in the file of this patent

UNITED STATES PATENTS

| 2,144,270 | Palmgren | Jan. 17, 1939 |
| 2,371,371 | Watson | Mar. 13, 1945 |
| 2,592,537 | Burtnett | Apr. 15, 1952 |
| 2,606,459 | Carnegie | Aug. 12, 1952 |
| 2,749,767 | Ebsworth | June 12, 1956 |
| 2,873,626 | Granryd | Feb. 17, 1959 |

FOREIGN PATENTS

| 602,497 | Great Britain | May 27, 1948 |